United States Patent [19]

Mueller et al.

[11] Patent Number: 5,413,975
[45] Date of Patent: May 9, 1995

[54] FIXING LARGE ZEOLITE AND ZEOLITE-LIKE MOLECULAR SIEVE CRYSTALS ON MOLDINGS

[75] Inventors: Ulrich Mueller, Neustadt; Wolfgang Hoelderich, Frankenthal; Hans D. Schaefer, Altrip; Ulrich Eiden; Norbert Woessner, both of Frankenthal, all of Germany

[73] Assignee: BASF Aktiengesellschaft, Ludwigshafen, Germany

[21] Appl. No.: 64,713

[22] Filed: May 19, 1993

[30] Foreign Application Priority Data

May 21, 1992 [DE] Germany .................... 42 16 846.5

[51] Int. Cl.⁶ .............................................. B01J 29/04
[52] U.S. Cl. ...................................... 502/60; 502/64; 502/69; 502/3; 502/4
[58] Field of Search .................. 502/60, 64, 69, 3, 4

[56] References Cited

U.S. PATENT DOCUMENTS

| | | | |
|---|---|---|---|
| 3,730,910 | 5/1973 | Albers et al. | 502/65 |
| 4,564,604 | 1/1986 | Iida et al. | 502/64 |
| 4,699,892 | 10/1987 | Suzuki et al. | 502/4 |
| 4,871,701 | 10/1989 | Danner et al. | 502/62 |
| 5,100,596 | 3/1992 | Haag et al. | 502/4 |

FOREIGN PATENT DOCUMENTS

| | | | |
|---|---|---|---|
| 55044 | 6/1962 | European Pat. Off. | |
| 304852 | 3/1989 | European Pat. Off. | |
| 4112358 | 10/1992 | Germany | 502/4 |
| 0286774 | 8/1978 | U.S.S.R. | 502/4 |

OTHER PUBLICATIONS

Chemische Reaktionstechnik, Thieme–Verlag, Stuttgart, pp. 163–193 (1987).
Ind. Eng. Chem. 56, (1964), 39 et seq.

*Primary Examiner*—Asok Pal
*Attorney, Agent, or Firm*—John H. Shurtleff

[57] ABSTRACT

Large zeolite and zeolite-like molecular sieve crystals of from 3 to 500 μm are fixed on moldings by a process in which an adhesion promoter is used or the moldings are softened.

11 Claims, 2 Drawing Sheets

FIXING LARGE ZEOLITE AND ZEOLITE-LIKE MOLECULAR SIEVE CRYSTALS ON MOLDINGS

The present invention relates to a process for fixing large zeolite and zeolite-like molecular sieve crystals of from 3 to 500 μm on moldings by means of an adhesion promoter or by softening a molding.

Processes catalyzed by heterogeneous catalysts are widely used in the chemical industry. The catalysts are preferably used in the form of moldings, for example as strands, extrudates, pellets, wagon wheels or in the form of stars or clover leaves, in order to avoid the pressure build-up in the reactor. On the other hand, mass transfer and acute transport problems in the catalyst bed can greatly influence the course of the reaction.

Various forms of reactors and catalyst have been tested in order to overcome these problems. "Chemische Reaktionstechnik", Baerns, Hofmann and Renken, Thieme-Verlag, Stuttgart, pages 163 to 193 (1987), discloses, for gas-phase reactions catalyzed by heterogeneous catalysts, the use of reactors in which the catalyst is present in the immediate vicinity of the reactor wall and free space is present longitudinally in the middle of the reactor. In these types of reactor, the catalyst is present in a cage specially mounted for this purpose (Ind. Eng. Chem. 56, (1964), 39 et seq.) or is fixed to the reactor wall by impregnation, for example by means of an aluminum wash coat. This procedure is known for zeolite catalysts, for example from JP 60/106 535, or for the preparation of thin films also from JP 60/028 826. EP-A-55 044 and U.S. Pat. No. 3,730,910 mention possibilities for the further production of zeolite composites.

Especially for pentasil zeolites, there is also the possibility of fixing by crystallization onto a preshaped carrier by the method stated in EP-A-304 852. However, this gives rise to disadvantages as a result of the large number of expensive operations. For kinetic reasons, a very small catalyst particle size is desirable, particularly in dehydration and oxidation reactions, since good results are obtained only with short residence times in the catalyst pellet, ie. with small diffusion distances of the starting materials and the products to the active catalyst surface and back to the gas phase. Kinetically more advantageous shapes of the catalyst are therefore desirable. Catalysts in the form of monoliths are therefore used, for example in SCR technology. This has the advantage that the pressure loss in the reactor bed is substantially reduced.

The preparation of such monoliths is difficult and requires special knowledge with regard to the addition of additives to the active material in order to achieve good strengths of the molding, and is very labor-intensive, for example when carrying out stepwise drying and calcination in long shaft furnaces.

The processes described above for the production of heterogeneous catalysts have the disadvantage that they comprise many process steps. Particularly where use in catalysis or the separation of substances is envisaged, this can however have an adverse effect on the reproducibility. In addition, the binder materials to date have been restricted to a small number, such as aluminas, clay minerals, cordierite or silica, which may in turn have, for example, undesirable catalytic activity.

If exothermic reactions occur in the catalytic reaction, it is difficult to remove the liberated heat rapidly with a conventional fixed-bed reactor, particularly in the case of reactions at low pressure. This may contribute to the generation of temperature peaks in the reactor, which may lead to irreversible damage to the catalyst.

If, on the other hand, catalytic reactions are endothermic, expensive process engineering measures must be taken in order, for example, to preheat the product stream with the aid of an exactly controlable heating zone.

It is an object of the present invention to provide, for the use of molecular sieve crystals, a possibility of remedying these abovementioned disadvantages and of fixing these materials permanently so that they can advantageously be used, for example, in catalysis and for the separation of substances.

BRIEF DESCRIPTION OF THE DRAWINGS

The drawings illustrate the invention with reference to Examples 5 and 9 below wherein.

Figure 1:
FIG. 1 is a scanning electron micrograph of a cross-section through a glass absorber sheet coated with aluminum pentasil crystals.

We have found that this object is achieved by a novel and improved process for fixing large zeolite and zeolite-like molecular sieve crystals of from 3 to 500 μm on moldings, wherein an adhesion promoter is used or the molding is softened.

Compared with existing methods, the novel process has the advantage that it is no longer necessary to mold the crystals with the aid of a binder material to give catalysts or adsorbents; instead, said crystals are applied directly to a molding and this coated molding is then used as a reactor or adsorber.

Advantages of the novel process are in particular that a smaller amount of active catalyst or adsorbent material is required than in the conventional procedure, that high gas velocities in conjunction with good heat transfer between reactor wall and catalyst can be realized and that simple regeneration can be effected.

The novel process can be carried out as follows:

The large primary crystals of zeolites or of zeolite-like molecular sieves having edge lengths of from 3 to 500 μm can be treated in the presence of, and in contact with, a corresponding molding at a temperature which on the one hand is below the transformation or melting point of the molecular sieve crystals and on the other hand is chosen sufficiently high that the corresponding molding merely softens at the surface without however melting.

Zeolites are understood as being crystalline aluminosilicates which have a highly ordered structure with a three-dimensional network of $SiO_4$ and $AlO_4$ tetrahedra which are linked by common oxygen atoms. The ratio of the Si and Al atoms to oxygen is 1:2 (cf. Ullmans Encyklopädie d. Techn. Chemie, 4th Edition, Volume 24, page 575 (1983)). The electrovalency of the aluminum-containing tetrahedra is balanced by the inclusion of cations in the crystal, for example of an alkali metal or hydrogen ion. Cation exchange is possible. The voids between the tetrahedra are occupied by water molecules prior to the dehydration by drying or calcination.

The zeolites are generally used in the acidic H form or neutral alkali form. In the zeolites, other elements, such as B, Ga, Fe, Cr, V, As, Sb, Bi or Be or mixtures thereof may be incorporated in the framework instead of aluminum, or the silicon can be replaced by another tetravalent element, such as Ge, Ti, Zr, or Hf.

Zeolites are divided into various groups according to their structure. A list of such structures is given in the literature (W. M. Meier and D. H. Olson, "Atlas of Zeolite Structure Types", 2nd Edition, Butterworths, London 1987).

Molecular sieves suitable for the novel process are zeolites from the mordenite group and zeolites of the faujasite type, for example Y, X or L zeolites. This group of zeolites includes the "ultrastable" zeolites of the faujasite type, ie. dealuminated zeolites. Processes for the preparation of such zeolites are described in "Catalysis by zeolites" Volume 5, from "Studies in Surface Science and Catalysis", ed. B. Imelik et al. Elsevier Scientific Publishing Comp. 1980, page 203, and "Crystal Structures of Ultra-stable Faujasites", Advances in Chemistry Series No. 101, American Chemical Society Washington, D.C., page 226 et seq. (1971), and in U.S. Pat. No. 4,512,961.

Zeolites and zeolite-like molecular sieves having the structure types AFI, FAU, LTA, DOH, DDR or mixed DOH/DDR structures are advantageously used, and zeolites of the pentasil type having an MFI or MEL structure are particularly advantageously employed.

Such pentasils have, as a common building block, a five-numbered ring composed of $SiO_4$ tetrahedra. They possess a high and variable $SiO_2/Al_2O_3$ ratio and pore sizes which are between those of the zeolites of type A and those of type X or Y.

These zeolites may have different chemical compositions. They are aluminosilicate, borosilicate, ferrosilicate, titanosilicate, vanadosilicate, beryllosilicate, gallosilicate, chromosilicate, arsenosilicate, antimonosilicate and bismuthosilicate zeolites or mixtures thereof and aluminogermanate, borogermanate, gallogermanate and ferrogermanate zeolites or mixtures thereof.

The aluminosilicate zeolite is prepared, for example, from an aluminum compound, preferably $Al(OH)_3$, $Al_2(SO_4)_3$ or a hydrolyzable organic aluminum compound, as an intermediate and a silicon component, preferably finely divided silica or colloidal silica, in aqueous amine solution, in particular in a polyamine, such as 1,6-hexane diamine or 1,3-propane diamine or triethylene tetramine solution, with or, in particular, without the addition of an alkali metal or alkaline earth metal compound, at from 100 to 220° C. under autogenous pressure.

These include the isotactic zeolites according to EP-A-34 727 or EP-A-4 504. The aluminosilicate zeolites obtained have an $SiO_2/Al_2O_3$ ratio of from 10 to 40,000, depending on the choice of the amounts of starting materials. Such aluminosilicate zeolites can also be synthesized in an ether medium, such as diethylene glycol dimethyl ether, triglyme or tetraglyme, in an alcoholic medium, such as methanol or 1,4-butanediol or 1,6-hexanediol or polyols, or in water.

The preparation of large monodisperse aluminosilicate zeolites prepared in the absence of alkali is described by Müller et al., A.C.S. Symp. Ser. Vol. 398 (1989), 346–359. According to this method of preparation, zeolites up to 300 μm can be obtained with high yields of solid.

The synthesis of large borosilicate zeolite crystals having an MFI structure is disclosed in DE-A-41 20 918. The size measured over the longitudinal crystallite axis is from 2 to 150 μm. In the preparation, an $SiO_2$-containing mixture of water, a tetraalkylammonium compound, a boron component and ammonia is subjected to a hydrothermal reaction with a molar ratio of ammonia/tetraalkylammonium of from 3:1 to 150:1, in the absence of a metal hydroxide or of a metal salt.

This process also provides the possibility of influencing the size of the resulting crystals and their size distribution in a simple manner by means of the composition of the reaction mixture by using, for example, a template mixture composed of tetrapropylammonium salts and tetrapropylammonium hydroxide, and requires only small amounts of tetraalkylammonium corresponding to the tetraalkylammonium/$SiO_2$ ratio of from 0.042:1 to 0.2:1, preferably from 0.042:1 to 0.15:1.

In particular, it is possible to obtain the resulting borosilicate zeolites predominantly in the form of uniform large particles which occur without significant agglomeration if, in the reaction mixture, molar ratios of $SiO_2/B_2O_3$ of from 10:1 to 500:1, preferably from 10:1 to 250:1, particularly preferably from 10:1 to 100:1, are used and/or a dilution of $SiO_2/H_2O$ of from 0.07:1 to 0.025:1, preferably from 0.05:1 to 0.04:1 is maintained. This alkali-free process furthermore makes it possible for the material to be obtained directly in an active H form after heat treatment at from 350° to 600° C., preferably from 400° to 550° C., particularly preferably from 450° to 500° C. and without additional ion exchange and, in particular owing to the crystallite size of more than 2 μm, ie. from 2 to 150 μm, preferably from 3 to 120μm, particularly preferably from 5 to 80 μm, without further shaping, and to be used as a catalyst. Since zeolites prepared in this manner have a very monodisperse particle size distribution and furthermore scarcely agglomerate as primary crystallites, they are particularly suitable for the fixing described according to the invention.

The similar preparation Of large titanium zeolite crystals having an MFI structure suitable for catalytic oxidation and ammoxidation reactions is mentioned in DE-A-41 38 155.

Ferrosilicate zeolites are obtained, for example, from an iron compound, preferably $Fe_2(SO_4)_3$ and a silicon compound, preferably finely divided silica in aqueous amine solution, and in particular 1,6-hexanediamine, with or without the addition of an alkali metal or alkaline earth metal compound, at from 100° to 220° C. under autogenous pressure.

The silicon-rich zeolites which can be used ($SiO_2/Al_2O_3 > 10$) include the ZSM types (from Mobil), Ferrierite, NU-1, NU-2, Silicalit® (from Union Carbide/UOP), zeolite-$\beta$ or silicon-rich, dealuminated Y-zeolites.

Crystals having the structure type DOH or DDR or mixed crystals having DOH/DDR structures can also be used for the novel process. The preparation of such crystals is described by Müller et al., "Recent Advances in Zeolite Science" (Editors Klinowski and Barrie) Elsevier, Amsterdam (1989), 241 to 252. The dimensions of the primary particles may be up to 200 μm.

If, owing to the method of preparation, the zeolites are not in the acidic H form but, for example, in the alkali metal or alkaline earth metal form, these can be converted completely or partly into the desired H form by ion exchange, for example with ammonium ions and subsequent calcination or by treatment with acids.

Microporous phosphates as mentioned by E. M. Flanigen et al. in "Aluminophosphate molecular sieves and the periodic table", Pure & Appl. Chem. 58, No. 10 (1986), 1351–1358 are also suitable for the novel process.

U.S. Pat. No. 4,310,440 discloses many such microporous aluminophosphates (abbreviation: AlPOs). According to this publication, they are prepared by using templates (structure formers) as starting components in addition to phosphorus- and aluminum-containing compounds. Suitable templates are a large number of organic nitrogen compounds (for example amines, ammonium compounds and nitrogen heterocycles). Depending on the type of template and the reaction conditions, it is possible to prepare many different aluminophosphate structures which are characterized by their different X-ray diffraction data.

The abovementioned aluminophosphates differ in the structure of their cavity system, ie. in pore size, pore volume and surface area. These differences result in different properties, such as adsorption capacities, the ability to separate certain substances or catalytic activity. Aluminophosphates consist of a crystal lattice which is composed of $TO_4$-tetrahedra, phosphorus and aluminium occuring as tetrahedron atoms T. In general, the numbers of $AlO_4$— and $PO_4$-tetrahedra are equal so that the crystal lattice does not carry any charge and hence no charge-balancing cations are present.

Microporous aluminophosphates are used as adsorbents and also as catalysts or as catalyst carriers (Review article: E. M. Flanigen et al.: "Structural, synthetic and physicochemical concepts in alumino phosphate-based molecular sieves" in "Innovation in Zeolite Materials Science" P. J. Grobet et al. (Ed.), Elsevier, 1988, pages 13 to 27).

The aluminophosphates prepared under hydrothermal conditions are, for example, AlPO-5, AlPO-8, AlPO-9, AlPO-11, AlPO-12, AlPO-14, AlPO-21, AlPO-25, AlPO-31 and AlPO-33 and MCM 9. Syntheses of these compounds are described in EP-A-132 708, U.S. Pat. No. 4,310,440, and Wilson et al., J. Am. Chem. Soc. 104 (1982), 1146.

For example, $AlPO_4$-5 (AFI) is synthesized by homogeneously mixing orthophosphoric acid with pseudoboehmite (Catapal ® SB) in water, adding tetrapropylammonium hydroxide to this mixture and then carrying out the reaction at about 150° C. for from 20 to 60 hours under autogenous pressure in an autoclave. The AlPO-5 filtered off is dried at from 100° to 160° C. and calcined at from 450° to 550° C.

The synthesis of particularly large crystals of AlPO-5 having an AFI structure is described by Müller et. al. in A.C.S. Symp. Ser. 398 (1989), 346–359. According to this publication, AFI aluminophosphate crystals having lengths of up to 500 μm can be prepared.

The preparation of a microporous aluminophosphate defined as $AlPO_4$-11 is described in U.S. Pat. No. 4,310,440, Examples 32 to 36. According to this publication, the compound is synthesized by using, as starting components, phosphoric acid, an aluminum compound and a dialkylamine, eg. di-n-propylamine or diisopropylamine. The mixture is treated hydrothermally. The product initially formed is a microporous aluminophosphate whose pores are filled with the template. The template can be removed by calcining this compound.

According to U.S. Pat. No. 4,440,871, it is possible additionally to incorporate silicon into the crystal lattice of these aluminophosphates, with the result that the silicoaluminophosphates (abbreviation: SAPOs) are obtained.

The synthesis of the SAPOs is effected in a similar manner to that of the AlPOs, a silicon source being additionally introduced into the synthesis mixture. The charges of the $AlO_4$—, $PO_4$-and $SiO_4$-tetrahedra present in the crystal lattice of the SAPOs do not in general balance, so that a charged crystal lattice whose charge must be balanced by opposite ions is obtained.

For this reason, SAPOs can also be used as ion exchangers, in addition to the applications already mentioned in the case of the AlPOs. SAPOs in their H form are also solid acid and can accordingly be used, for example, as acidic catalysts.

The synthesis of these compounds is described, for example, in EP-A-103 117 or U.S. Pat. No. 4,440,871. These silicoaluminophosphates have a zeolite structure. SAPOs are prepared by crystallization from an aqueous mixture at from 100 to 250° C. and autogenous pressure in the course of from 2 hours to 2 weeks, the reaction mixture of a silicon component, an aluminum component and a phosphorus component being reacted in aqueous organic amine solutions.

The preparation of a microporous silicoaluminophosphate defined as SAPO-11 is described in U.S. Pat. No. 4,440,871, Examples 15 to 22, and is carried out in a manner similar to that described for AlPO-11, the only difference being that a reactive silicon source is additionally introduced into the reaction mixture.

The $AlPO_4$-11 and SAPO-11 have an identical structure, which was described, for example, by Bennett et al. (Zeolites, 7 (1987), 160). The structure is classified as a crystal structure under the designation AEL by Meier and Olson ("Atlas of Zeolite Structure Types" 2nd Ed., Butterworths, London, 1987).

A new possibility for the synthesis of $AlPO_4$-11 and SAPO-11 using 1,2-bis(4-pyridyl)ethane is mentioned in DE-A-41 31 68.

For example, ZYT-5, ZYT-6, ZYT-7, ZYT-9, ZYT-11 and ZYT-12 (JP 59/217 619) are also suitable silicoaluminophosphates. The reactors produced according to the novel process using the abovementioned zeolites and zeolite-like molecular sieve crystals can be used in heterogeneous catalysis for nucleophilic and electrophilic substitutions, for addition and elimination reactions, for double bond and skeletal isomerizations, including rearrangement reactions, and for redox reactions, for example for alkylation, isomerization, disproportionation, acylation, cyclization, hydration, dehydration, amination, hydrogenation, dehydrogenation, dehydrocyclization, hydroxylation, oxidation, epoxidation and skeletalisomerization reactions and combinations of these reactions, for the selective reaction of organic molecules.

Particular examples are the alkylation and isomerization of xylenes, phenols, cresols, ethylbenzenes, anilines substituted in the nucleus, dihydroxybenzenes and similar halogenated isomeric aromatics.

Industrially important reactions are, for example, the alkylation and isomerization reaction to give p-xylene, stated in U.S. Pat. No. 4,670,616 or EP-A-54 385.

The reactors produced by the novel process can moreover be used in the conversion of methanol into a mixture of $C_2$— to $C_4$-olefins. Reactions of this type are described, for example, in W. Hölderich et al., "Aluminosilicate and Borosilicate Zeolites and their use in the conversion of methanol to olefins" in D. Olson and A. Bisio (eds.) Proceedings of 6th YZC, Reno, Nev. 1983, Butterworths (1984), pages 545 to 555 or alternatively in W. Hölderich, "Zeolites: Catalysis for the synthesis of organic compounds", Elsevier, Studies Surf. Sci., Catal., Vol. 49, Amsterdam (1989), pages 69 to 93, and W. Hölderich and H. van Bekkum, Stud. Surf. Sci., Catal. 58 (1991), 631–726.

Rearrangement reaction which can advantageously be carried out using the reactors produced according to the invention are, for example, syntheses of phenylacetaldehydes or phenylethanols, as stated in DE-A-37 40 270 and in DE-A-38 01 106.

In the production of reactors or adsorbers by the novel process, selected moldings can be preheated to the softening point in a furnace or a movable heating zone. A free-flowing powder of large zeolite or zeolite-like molecular sieve crystals is continuously dusted onto the molding surface preheated in this manner. The crystals remain adhering to the softened molding surface in a thin layer comprising about 1 to 5 crystal layers and are permanently fixed thereon after the coated molding has been cooled. If the crystallite size is too small, there is a danger that the majority of the crystals will sink into the softened molding surface and will no longer be available for separation of substances or catalytic reactions during subsequent use. Crystals which do not adhere can be separated off for further coatings and reused.

In order to produce particularly hard coatings, the molding surface may furthermore be pretreated with an adhesion promoter prior to dusting with crystals. If the moldings are intended to be used subsequently at high temperatures, it has proven useful to use a mineral thermal cement for the coating in the case of glass surfaces.

Crystals having a size of at least 3 μm have proven suitable, this relating to the smallest dimension in the case of irregularly shaped crystals.

For pentasil crystals prepared in the absence of an alkali, the amine-containing form of the crystals can be used for the novel coating method if moldings whose softening point is above 400° C., in particular above 500° C., are coated. The exothermic combustion of the amine, ammonium or tetraalkylammonium forms still present in the zeolite pores supports the fixing of the zeolite crystals to the surface of the solid. This makes it possible to prepare, directly from the 'as made' form of crystals prepared in the absence of an alkali, a molding which can be used for catalytic reactions and has zeolite crystals in the acidic H form. In contrast to a conventional method for working up zeolite powders and further processing to give a supported catalyst, the novel procedure makes it possible to dispense with energy-consumptive calcination and molding steps while simultaneously reducing the amount of expensive zeolite active material and dispensing with additional binder material.

The novel process is advantageous in that inert materials which are easy to mold, for example glass in the form of spheres, porous grit, tubes, coiled tubes, sheets, rods or bulbs, are coated in a single operation so that all that has been done is that the chemically inert carrier has been coated permanently on the surface with a small amount of zeolite active material for subsequent use. Particularly in the case of glass tubes, the inner wall can be coated according to the invention so that, when used as a wall reactor, it is possible to pass the reaction medium through the remaining free tube cross-section during the catalytic reaction at high velocity and substantially without a pressure drop along the reactor. If high selectivities are required in a zeolite-catalyzed reaction, in the wall reactor produced according to the invention unconverted starting material can be recycled to the inlet stream and the conversion based on end product can thus be increased.

Since, in this type of wall reactor, the active component is firmly anchored to the surface of the moulding, there is very good heat transfer between the catalyst and the reactor wall surface, so that the occurrence of temperature peaks is avoided where it is intended to effect isothermal operation of a highly exothermic reaction.

Similarly, when using a novel tube or a sheet in the case of substance separation problems, the rapid heat transfer can be advantageously used to permit virtually isobaric switching between adsorption and desorption step by means of rapid temperature variation. With regard to use as a wall reactor or as an adsorber, there is the additional advantage that components conforming to standards and coated according to the invention can be used in such a way that they can be built up in a modular manner for the particular application. This is advantageous in particular with regard to use as a wall reactor, since deactivated modules can be changed rapidly and, in contrast to conventionally operated reactors, without giving rise to highly contaminated mixtures of abraded catalyst material and product.

Owing to the small amount of active material, brief flushing of the modules with air at from 300° to 550° C. is generally sufficient for regeneration.

The examples which follow illustrate the novel process and its advantages in catalytic reactions and adsorptive separations of substances.

EXAMPLES

Example 1

This example illustrates the synthesis of uniform large boron pentasil crystals.

2.22 kg of tetrapropylammonium bromide, 7.96 kg of silicasol LUDOX® AS-40, 8.9 kg of demineralized water and 386 g of trimethyl borate were initially taken in a steel autoclave having a stirring apparatus. 7.2 kg of an aqueous ammonia solution (25% by weight) were added to this suspension. The resulting suspension was heated to 185° C. in the closed autoclave while stirring (100 rpm) and was crystallized in the course of 168 hours. After cooling, the solid was filtered off, washed neutral, dried at 120° C. and finally subjected to a heat treatment at 500° C.

The yield of borosilicate zeolite was 97%, based on $SiO_2$. The chemical analysis of the product gave a composition of 96.5% by weight of $SiO_2$, 1.48% by weight of $B_2O_3$ and traces of sodium (140 ppm) and $Al_2O_3$ (90 ppm). The product was completely crystalline and showed the powder diffraction pattern typical of a boron pentasil having the MFI structure.

The crystals had a mean size of 12 μm and a narrow size distribution.

Example 2

This example illustrates the synthesis of uniform large crystals over a long crystallization time in a static experiment.

6.9 g of tetrapropylammonium bromide, 75.3 g of silicasol LUDOX® AS-408, 83.1 g of demineralized water and 3.66 g of trimethyl borate were initially taken in a teflon-lined steel autoclave. 68.8 g of an aqueous ammonia solution (25% by weight) were added to this suspension.

The resulting suspension was homogenized, heated to 185° C. in the closed autoclave and crystallized in the course of 168 hours. After cooling, the solid was filtered off, washed neutral, dried at 120° C. and finally subjected to a heat treatment at 500° C. The yield of borosilicate zeolite was 98%, based on the $SiO_2$ used.

The chemical analysis of the product gave a composition of 97.6% by weight of $SiO_2$, 1.7% by weight of $B_2O_3$ and traces of sodium (120 ppm). The product was completely crystalline and showed the powder diffraction pattern typical for a boronpentasil having the MFI structure. The crystals had a mean size of 50 μm with a narrow particle size distribution.

Example 3

This example illustrates the synthesis of a borosilicate zeolite using a mixture of tetrapropylammonium hydroxide and tetrapropylammonium bromide, the synthesis time furthermore being shorter.

34.7 g of tetrapropylammonium bromide, 468 g of silica-sol LUDOX® AS-40, 524 g of demineralized water and 22.8 g of trimethyl borate were initially taken in a steel autoclave having a stirring apparatus. 423 g of an aqueous ammonia solution (25% by weight) and 38.8 g of an aqueous tetrapropylammonium hydroxide solution (20% by weight) were added to this suspension.

The resulting suspension was heated to 185° C. in the closed autoclave while stirring (100 rpm) and was crystallized in the course of 46 hours. After cooling, the solid was filtered off, washed neutral, dried at 120° C. and finally subjected to a heat treatment at 500° C.

The yield of borosilicate zeolite was 96%, based on $SiO_2$ used. The chemical analysis of the product gave a composition of 97.1% by weight of $SiO_2$, 1.69% by weight of $B_2O_3$ and traces of sodium (130 ppm) and $Al_2O_3$ (1200 ppm). The product was completely crystalline and showed the powder diffraction pattern typical for a boron pentasil having the MFI structure.

The crystals had a size distribution of from 5 to 22 μm.

Example 4

This example illustrates the alkali-free synthesis of uniformly large aluminum pentasil crystals.

0.043 kg of tetrapropylammonium bromide, 0.446 kg of silicasol LUDOX® AS-40, and 0.658 kg of demineralized water were initially taken in a steel autoclave. 26.5 g of aluminum triisopropylate and 0.426 kg of an aqueous ammonia solution (25% by weight) were added to this suspension. The resulting suspension was heated to 185° C. in the closed autoclave while stirring (100 rpm) and crystallized in the course of 120 hours. After cooling, the solid was filtered off, washed neutral, dried at 120° C. and finally subjected to a heat treatment at 500° C.

The yield of aluminosilicate zeolite was 95%, based on $SiO_2$ used. The chemical analysis of the product gave an Si/Al molar ratio of 23.

The product was completely crystalline and showed the powder diffraction pattern typical for an aluminum pentasil having the MFI structure. The crystals had a mean size of from 30 to 50 μm.

Example 5

This example serves as a comparison and describes the use of aluminumpentasil zeolite crystals prepared in Example 4 as heterogeneous catalysts in a conventional fixed-bed procedure for the conversion of ethylbenzene into diethylbenzenes.

The aluminumpentasil crystals synthesized, dried and calcined in Example 4 were converted into 2 mm pellets with the aid of a press (pressure $10N/m^2$), and a particle fraction of from 1 to 1.6 mm was separated off using a sieve. About 2.5 g of the material thus obtained was accurately weighed, introduced into a coil-tube reactor (length 600 mm, internal diameter 6 mm) and used in a through-circulation oven.

The catalytic reaction was carried out at 250° C. The starting material used was ethylbenzene which was introduced via a saturator at 20° C. in a nitrogen stream having a flow rate of 10 l/hour. The total reaction time was 8 hours. The resulting product mixture was analyzed by gas chromatography.

The resulting conversion of ethylbenzene was 3.4%, the selectivity of p-diethylbenzene being 67% and that of m-diethylbenzene being 33%, based in each case on the product.

Example 6

This example describes the possibility for fixing, according to the invention, aluminumpentasil zeolites and thus controlling the reaction stated in Example 5 in a wall reactor to give a high selectivity with respect to the desired product p-diethylbenzene.

Glass tubes having a length of 300 mm and an internal diameter of 6 mm were filled with the zeolite crystals prepared in Example 4 and were heated to 600° to 650° C. for from 10 to 30 minutes while being passed horizontally and with rotation through an annular heating zone.

After cooling, the crystals which did not adhere to the inner wall of the tube were removed, and the inside of the tube was cleaned by treatment with compressed air. The coating with zeolite crystals was determined gravimetrically as 167 $g/m^2$.

The individual tubes were then coupled together by means of glass adapters to form a module arranged in series. The module was placed in a through-circulation oven and heated to the reaction temperature of 250° C.

The catalytic reaction took place at 250° C. in a nitrogen stream saturated at 20° C. with ethylbenzene, the flow rate being 10 l/h.

The resulting reaction products were characterized by gas chromatography. At conversion of ethylbenzene of from 2 to 2.5%, a selectivity of 100% with respect to p-diethylbenzene was found. No m- or o-diethylbenzenes were observed in the product stream even after a 3-fold reaction time of 6.7 hours in each case.

Example 7

The rearrangement of styrene oxide to give p-phenylacetaldehyde in a conventional fixed-bed reactor over a boron zeolite catalyst obtained from the boronpentasil zeolite crystal powders prepared in Example 1 is described as a Comparative Example.

The zeolite powder obtained from the boronpentasil crystals prepared in Example 1 was compressed to give 2 mm pellets using a mechanical press tool. The pellets were then separated to give a sieve fraction of from 1 to 1.6 mm. 3.5 g of catalyst were installed in a coil-tube reactor.

The reactor was brought to the reaction temperature of 240° C. At 12 mbar, from 9.6 to 37.8 g/h of styrene oxide (heated to 110° C. in an upstream evaporator)

were passed over the catalyst. The reacted mixture was condensed and was analyzed by gas chromatography.

At conversion of 100% of styrene oxide used, a yield of phenylacetyldehyde of more than 99.8% was found after reaction for six hours.

The temperature in the catalyst bed increased from 240° C. to 315° C. The spent catalyst was blackish brown and caked and was difficult to remove from the reactor.

Example 8

The reaction stated in Example 7 was carried out isothermally over boronzeolite crystals fixed according to the invention in a tubular wall reactor having a total length of 600 mm.

At 15 g/h of styrene oxide and 15 mbar, the reacted mixture was condensed after a reaction time of three days and was analyzed by gas chromatography.

The conversion was 100%, based on styrene oxide used, and the yield of phenylacetaldehyde was more than 99.5%. A temperature increase in the tubular wall reactor above the reactor temperature of 240° C. was not observed.

After the reaction, the cooled glass tube was a pale beige color. The regeneration was carried out by passing air over at 450° C. in the course of 30 minutes.

Example 9

This example illustrates the novel application and permanent fixing of large aluminumpentasil zeolite crystals on a glass layer and the use of this element as a sheet adsorber for separating off n-hexane.

In a procedure similar to that in Example 6, a 2 mm thick glass sheet was coated with the aluminumpentasil crystals prepared in Example 5, Thermokitt ® additionally being used as an adhesion promote. Thermokitt ® is a readily available thermal cement for metal, glass, porcelain and similar materials. FIG. 1 shows a scanning electron micrograph of a cross-section through the adsorber sheet.

The adsorptivity of the adsorber sheet produced according to the invention for n-hexane was tested in comparison with the pure aluminumpentasil crystals as powder.

Figure 2:
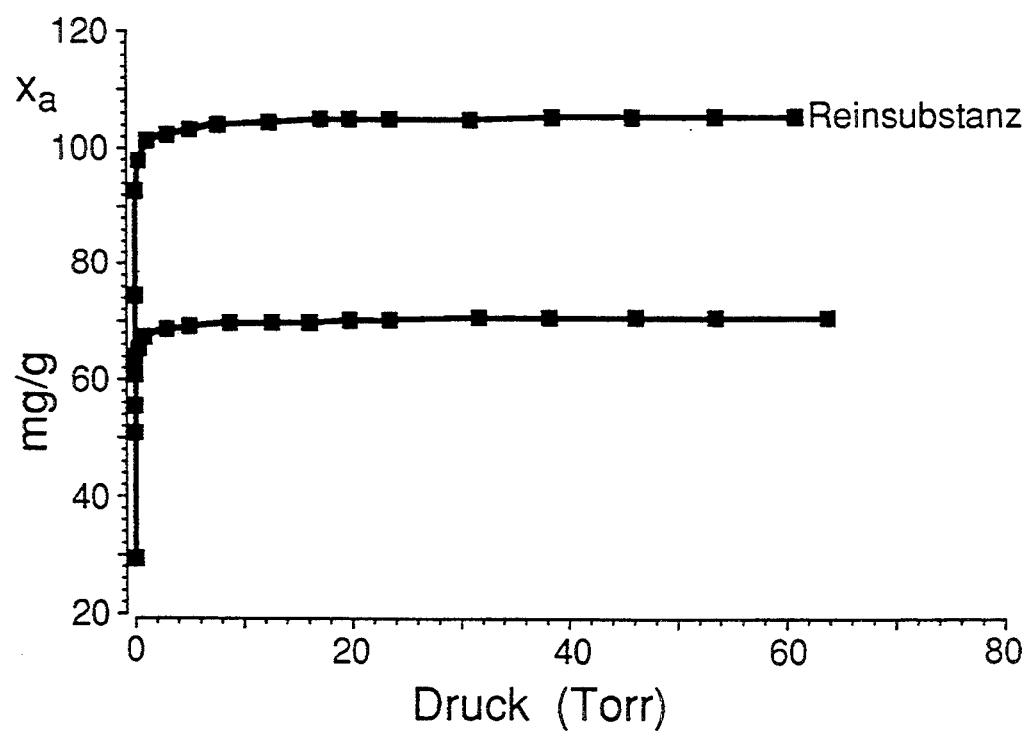
FIG. 2 is a graph showing the measured isotherms for both the glass absorber sheet and the pure aluminum pentasil crystals of FIG. 1.

The adsorption was carried out after activation at 200° C. and under greatly reduced pressure and after cooling at 20° C. in a Sartorius ® microbalance. FIG. 2 shows the measured isotherms both for the adsorber sheet and for the pure aluminumpentasil crystals. It shows the typical curve of a type I form characteristic for microporous adsorbents. Under the conditions of measurement, the pure aluminumpentasil crystals have an adsorption capacity of 104 mg n-hexane/g of zeolite and the adsorber sheet with the fixed crystals has an adsorption capacity of 70 mg n-hexane/g of zeolite.

This shows that the large pentasil crystals fixed according to the invention can be used for adsorption and retain their typical micropore properties.

We claim:

1. A process for the manufacture of a supported zeolite, aluminum phosphate or silicoaluminophosphate catalyst in which molecular sieve crystals of the catalyst are affixed to an inert, amorphous and non-porous molding composed of glass, ceramic, metal, polymeric materials or glass- or carbon-containing polymeric composites which has been preshaped as a structural element to act as a carrier for the catalyst, said process comprising:

preheating said structural element to its softening point without melting it, and coating the surface thereof with a free-flowing powder of said catalyst crystals for adherence to said surface in its softened state, said crystals having a particle size of from 3 μm to about 500 μm and a transformation or melting point which is above the softening point of said structural element: and then cooling said structural element to permanently affix at least a single layer of said catalyst crystals thereto.

2. A process as claimed in claim 1, wherein glass is used as the preshaped support.

3. A process as claimed in claim 2, wherein a mineral thermal cement as an adhesion promoter is applied to the glass surface to be coated prior to the preheating step.

4. A process as claimed in claim 1, wherein said catalyst crystals have a molecular sieve structure of the zeolite or pentasil zeolite types identified as AFI, FAU, DOH, DDR, mixed DOH/DDR, MFI or MFL.

5. A process as claimed in claim 1, wherein said catalyst crystals are of the pentasil type in the acidic H form, in the ammonium form or in an alkali-free form still containing an amine or a quaternary ammonium salt.

6. A process as claimed in claim 1, wherein the catalyst crystals are irregularly shaped with the smallest dimension of size being at least 3 μm.

7. A process as claimed in claim 1, wherein the catalyst crystals are of the pentasil zeolite type which have been prepared in the absence of an alkali but in the presence of aqueous ammonia, an amine, a tetraalkylammonium compound or mixtures thereof so as to retain ammonium, amine or tetraalkylammonium components in the pores of the catalyst, and said crystals are coated on a glass as the preshaped structural element having a softening point above 400° C.

8. A process as claimed in claim 7, wherein the catalyst crystals are a borosilicate of the pentasil zeolite type.

9. The supported catalyst structure obtained by the process of claim 1.

10. The supported catalyst structure obtained by the process of claim 9.

11. The supported catalyst structure obtained by the process of claim 8.

* * * * *